UNITED STATES PATENT OFFICE.

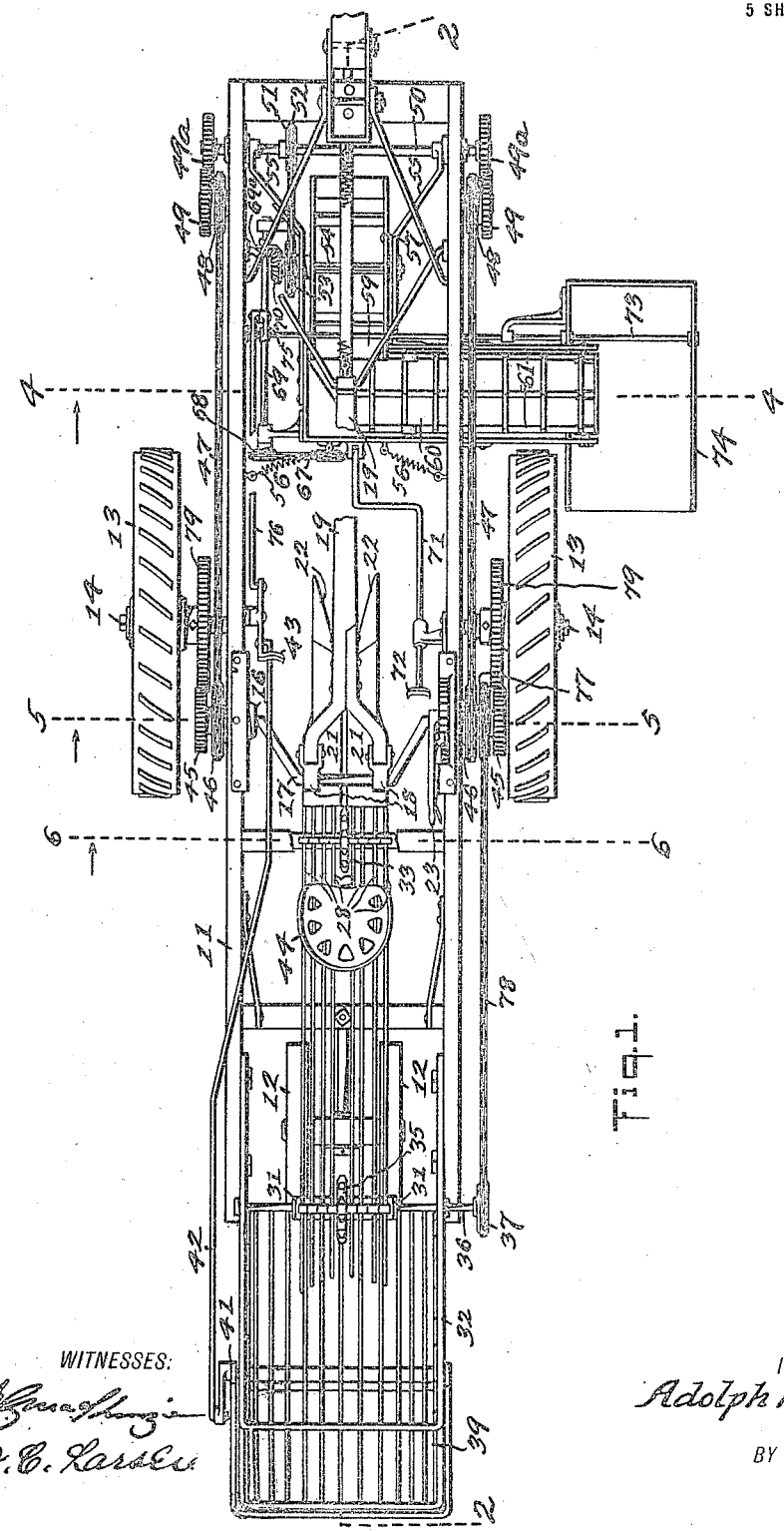

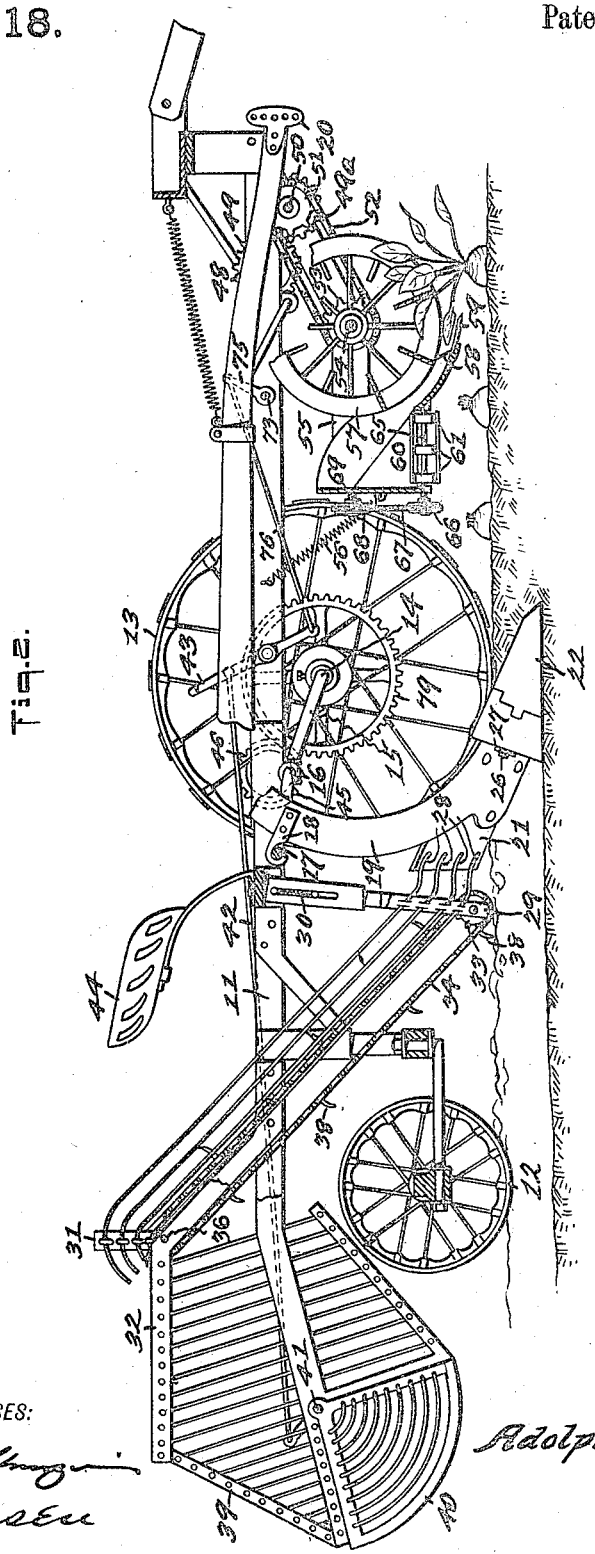

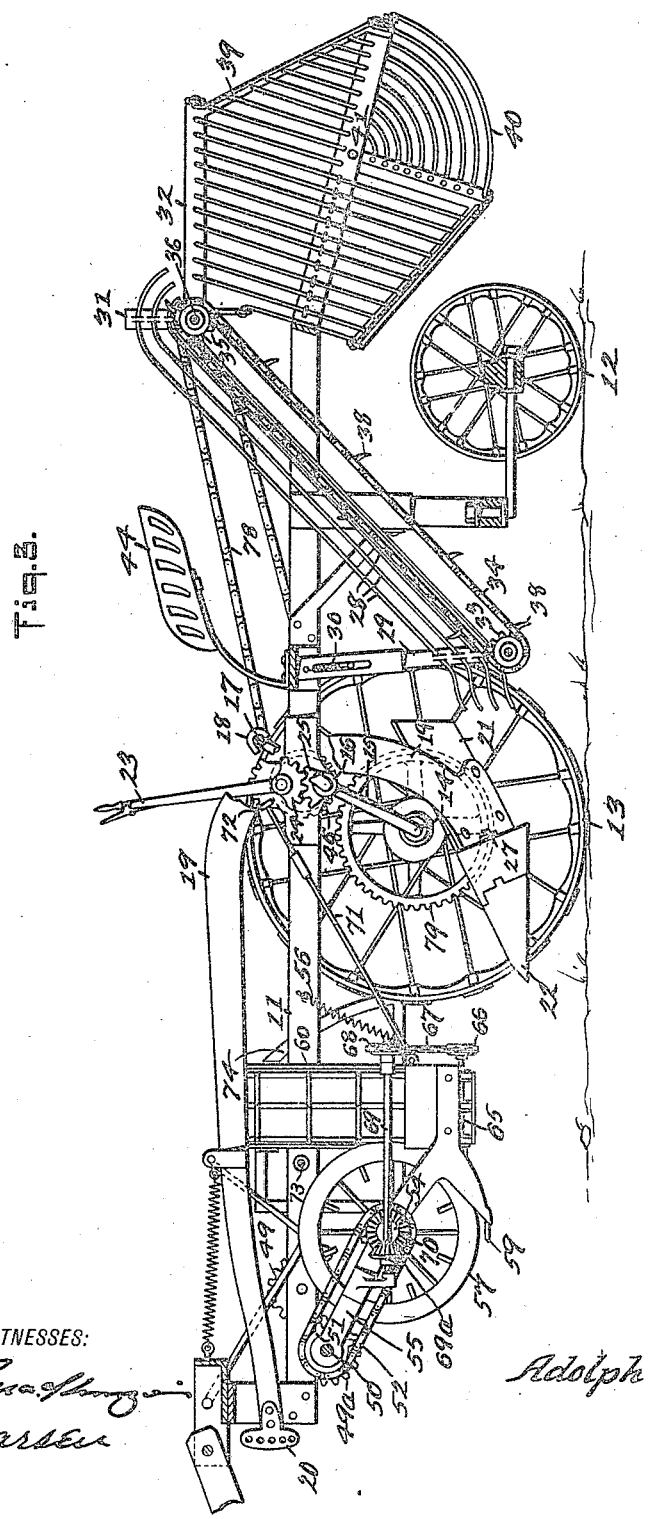

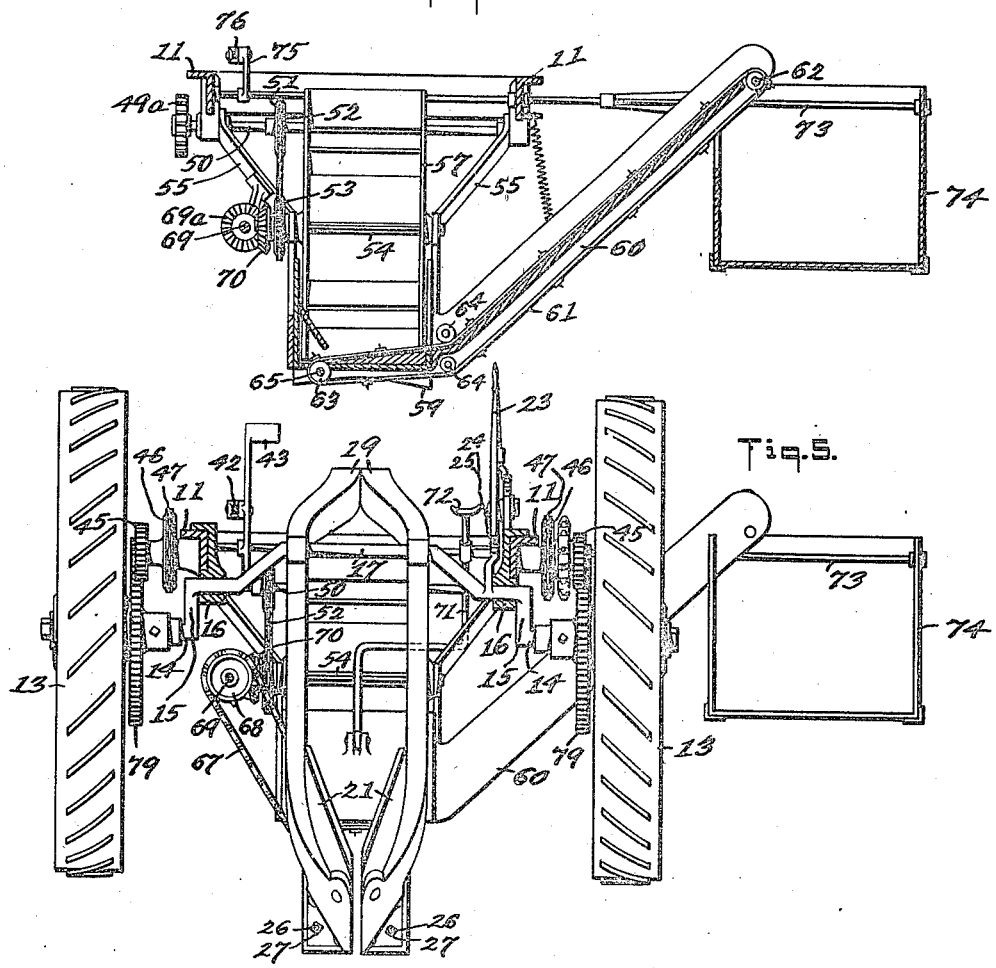

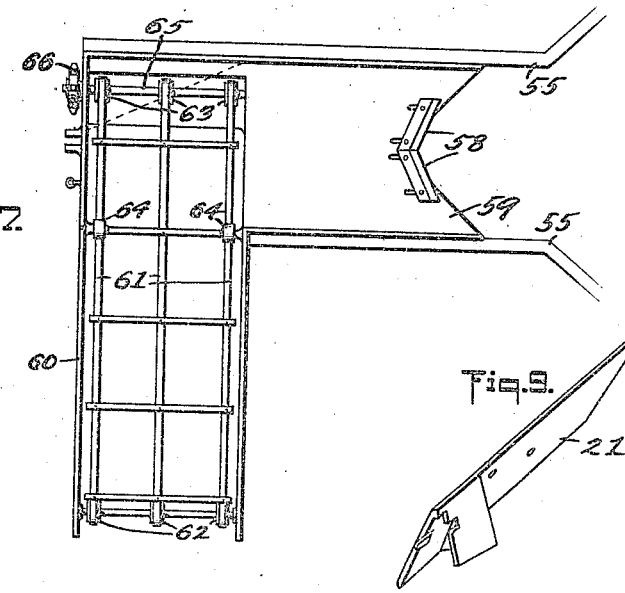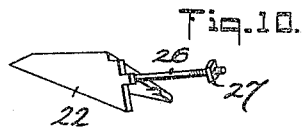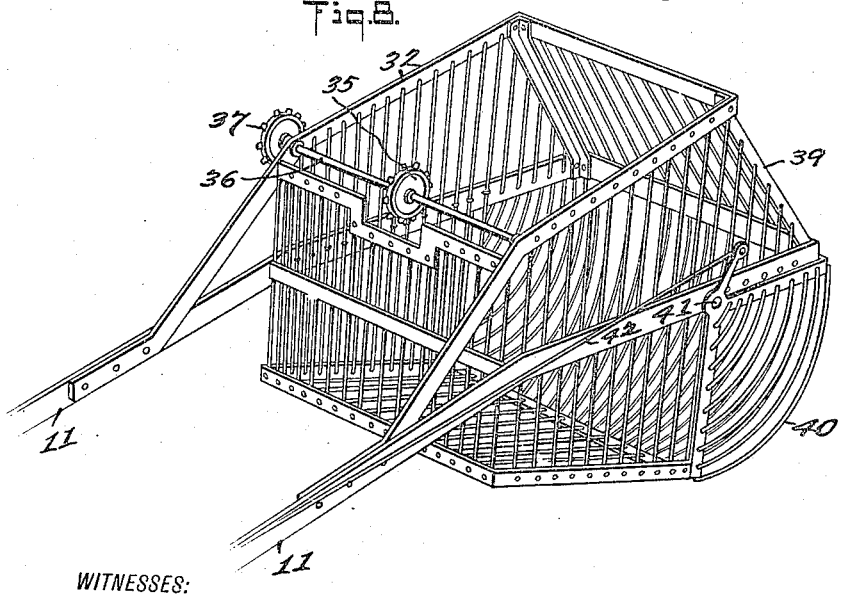

ADOLPH F. DJUBERG, OF CONSUL, SASKATCHEWAN, CANADA.

BEET-HARVESTER.

1,172,118.

Specification of Letters Patent. Patented Feb. 15, 1916.

Application filed July 1, 1915. Serial No. 37,483.

*To all whom it may concern:*

Be it known that I, ADOLPH F. DJUBERG, a citizen of the United States, and a resident of Consul, Province of Saskatchewan, Dominion of Canada, have invented certain new and useful Improvements in Beet-Harvesters, of which the following is a specification.

My invention relates to the harvesting of beets, and the main object thereof is to provide a vehicle having means thereon for topping the beets, means for raising the beets out of the ground, means for conveying the beets to a suitable hopper, means for conveying the tops to a suitable basket, means for discharging the beets and tops in separate piles at desired times, and means for rendering the parts inoperative at will.

My invention is fully described in the following specification, of which the accompanying drawings form a part, in which like characters refer to like parts in each of the views, and in which:—

Figure 1 is a plan view of a beet harvester constructed in accordance with my invention, with several of the parts broken away; Fig. 2 is a side elevation partly in section on the line 2—2 of Fig. 1; Fig. 3 is a similar view from the opposite side, with some of the parts in different positions; Fig. 4 is a section taken on the line 4—4 of Fig. 1; Fig. 5 is a section taken on the line 5—5 of Fig. 1; Fig. 6 is a section taken on the line 6—6 of Fig. 1; Fig. 7 is a detached, plan, view of part of the beet topping and top conveying mechanism; Fig. 8 is a detached perspective view of the beet basket or hopper; Fig. 9 is a detached perspective view of one of the moldboards which I employ; and Fig. 10 is a similar view of one of the plow points, showing its manner of connection with the moldboard.

In the drawings forming a part of this application I have shown a main frame 11 supported at its rear end by trailer wheels 12, preferably swiveled, and approximately centrally of said frame by main wheels 13 carried, each, by a stub-shaft 14 secured to an arm 15 pivoted in a bearing 16 on the main frame 11, and continued rearwardly to form a yoke 17, the said stub-shafts, arms, and yoke being preferably integral.

Suspended from the yoke 17 by means of hook members 18, Fig. 2, is a forked plow-beam 19 having the usual clevis 20 at its forward end and the downwardly directed forks of which carry moldboards 21 in turn carrying points or shares 22 in detachable connection therewith, and it will be seen that when the yoke 17 is depressed to carry the plow points into operation the main frame 11 moves downwardly, whereas when the plow points are raised out of operative positions the main frame is raised with respect to the main wheels 13.

Carried by the main frame 11 is a hand-lever 23 having a segment gear 24 at its lower end enmeshed with a segment gear 25 keyed or otherwise secured on the pivoted ends or portions of the arms 15 whereby the plow points may be raised or lowered at will, this being clearly shown in Fig. 3, the segment gear 25 being arranged adjacent one of the bearings 16. The plow points 22 are tongued at their rear ends to fit into similarly formed recesses in the forward ends of the moldboards, each of said points having a rearwardly directed bolt 26 secured thereto and adapted to engage with the respective moldboard and be secured thereto by means of a nut 27. These points are arranged side by side and adjacent each other, the inner faces thereof being downwardly inclined toward each other to provide a trough formation therebetween to hold and guide the beets when raised from the ground by the plow points moving thereunder at each side thereof.

Bearing against the rear ends of the moldboards 21 are a plurality of rods 28 collectively forming a trough, Fig. 6, said rods being carried adjacent their lower ends by bars 29 in resilient connection with the main frame 11, as shown at 30, Figs. 2, 3, and 6, to permit vertical movement of said bars and lower rod ends. The upper ends of said rods are slidably mounted in supports 31 carried by frame members 32 supported on and above the side members of the main frame 11, this manner of connection of the upper rod ends permitting free movement of the lower rod ends.

In the lower ends of the bars 29 is a transverse shaft for a sprocket wheel 33, arranged between the sets of rods 28, for an endless chain 34 movable upwardly in the bottom of the trough formed by said rods and over a sprocket wheel 35 on a shaft 36 having a sprocket wheel 37 at one end. The chain 34 is provided with a plurality of spikes 38 at intervals adapted to engage the beets, after they have been forced rearwardly between the moldboards 21, to carry the same to a hopper 39, open at its top, preferably formed of rods as shown, and also having an opening in its bottom normally covered by a closure 40 pivoted at 41 and operable by means of a rod 42 in pivotal connection with a pedal 43 located forwardly of the driver's seat 44.

Carried by the main frame 11, above the bearings 16, are stub shafts not shown for spur pinions 45, each of which carries a sprocket wheel 46 engaged with a chain 47 also engaged with the respective ones of two sprocket wheels 48 also rotatable on stub shafts not shown and provided, each, with a spur pinion 49. These spur pinions 49 are enmeshed with spur gears 49ª keyed on a shaft 50 rotatable in suitable bearings carried by the main frame 11, this shaft 50 having a sprocket wheel 51 thereon around which is passed a chain 52 also passed around a sprocket wheel 53 on a shaft 54 rotatable in plates 55 pivoted on the shaft 50 and the outer ends of which are movable through an arc of a circle, toward or from the ground, although said outer ends are supported by springs 56 to maintain the same in raised position under normal conditions without preventing forcible downward movement thereof.

The shaft 54 has a rotary cutter 57 secured thereon operating in conjunction with knives 58 on a runway 59 carried by the plates 55, as clearly shown in Figs. 2 and 3, the cutter action being similar to the action of a lown-mower. This runway terminates in a transverse runway 60, Fig. 7, likewise carried by the plates 55, and in the bottom of which is an endless conveyer belt 61, Fig. 4, substantially horizontally arranged for a portion of the length of the runway 60 and upwardly and outwardly inclined for the balance thereof; the belt 61 is held on upper and lower rollers 62 and 63, respectively, and guided by rollers 64, the roller 63 being keyed on a shaft 65 also carrying a sprocket wheel 66 for a chain 67 also engaged with a sprocket wheel 68 on a shaft 69; the shaft 69 is provided with a bevel pinion 69ª at its other end enmeshed with a bevel gear 70 on the shaft 54.

Because of the plates 55 the runways, convever belt, cutters, and belt actuating means, are movable as a unit, a rod 71 being in pivotal connection with the runway 60 and provided with a pedal 72 at its opposite end adjacent the driver's seat, whereby the driver is enabled to depress the cutters at will, against the action of the spring 56.

Carried by the main frame 11, above the runway 59, is a shaft 73 which carries a basket 74 at its outer end, said basket being open at its top and rear side, and being arranged directly beneath the upper belt conveyer roller 62 to receive matter carried thereto by the belt or belts 61; at its opposite end this shaft 73 is provided with a crank-arm 75 connected, by means of a rod 76, with the foot pedal 43, and it will be seen that if this pedal be actuated the shaft 73 is rotated to revolve the basket 74 through a partial revolution to dump the contents thereof in a pile on the ground, this pedal action also dumping the beets in the hopper 39 in a separate pile. The corresponding spur pinion 45 also carries a sprocket wheel 77 connected, by means of a chain 78, with the sprocket wheel 37 on the shaft 36, and it will be seen that when the spur pinions 45 are rotated the conveyers at each end of the machine are actuated, as is also the rotary cutter 57. These spur pinions 45 are adapted to be enmeshed with relatively large spur gears 79 on the main wheels 13 and, when so enmeshed and the machine being forwardly moved as by horses, the parts just mentioned are actuated. This meshing of the pinions 45 and gears 79 occurs when the main frame moves downwardly with respect to the axis of the main wheels by manipulation of the hand-lever 23 and, because of the eccentric arrangement of the axes of the pinions 45 and the bearings of the main wheel carrying arms 15, when the main frame 11 is raised with respect to the axis of the main wheels 13 by means of the hand-lever 23, the pinions 45 are separated from the gears 79 and the operable parts are rendered inactive although the machine may still be drawn or otherwise propelled. It will be noted that this actuation of the operable parts occurs when the plow points are lowered into operative positions, and only at such time.

It will thus be seen that I provide a harvester for beets which tops the plants, digs out the beets, dislodges the earth therefrom, and stores the tops and the beets in different receivers adapted to be dumped at desired times to form separate piles of both tops and beets at desired points, ready for gathering by wagons and the like. The beet conveyer accommodates itself to surface inequalities over which the machine is drawn, and the top cutters are adjustable as to their height from the ground at the will of the operator. The parts may be moved into and out of gear at any time, and no injury to the beets can occur.

The machine may be used for harvesting vegetation other than beets without any change over the construction shown, and changes therein may be made, within the scope of the following claims, to adapt the same to other uses than that described.

My machine is composed of relatively few parts and is not likely to get out of order to require repair; it is simple in construction and in operation and is entirely under the control of one man; and, in view of the results accomplished, my machine is comparatively inexpensive to build.

Having fully described my invention, what I claim as new, and desire to secure by Letters Patent, is:—

1. The combination of a frame, arms pivoted thereto, main wheels carried by said arms, a yoke carried by said arms diametrically opposite said wheels, means for moving said arms on their pivots to raise said wheels or to raise said yoke with respect to said frame, and a plow carried by said yoke.

2. The combination of a frame, arms pivoted thereto, main wheels carried by said arms, a yoke carried by said arms diametrically opposite said wheels, means for moving said arms on their pivots to raise or lower said frame with respect to said wheels and to lower or raise said yoke with respect to said frame, a plow suspended from said yoke, a rotary cutter, and means for actuating said cutter when said plow is in lowermost and operative position.

3. The combination of a frame, arms pivoted thereto, main wheels carried by said arms, a yoke carried by said arms diametrically opposite said wheels, means for moving said arms on their pivots to raise or lower said frame with respect to said wheels, a vegetable digger carried by said yoke, a vegetable receiving hopper, a conveyer interposed between said digger and hopper, and means for operating said conveyer actuated by said main wheels when said digger is in operative position.

4. The combination of a frame, arms pivoted thereto, main wheels carried by said arms, a yoke carried by said arms diametrically opposite said wheels, means for moving said arms on their pivots to raise or lower said frame with respect to said wheels, a vegetable digger carried by said yoke, a conveyer adjacent thereto, a hopper adjacent said conveyer, a vegetable top cutter, a receiving basket for said tops, a conveyer interposed between said cutter and basket, and means for operating said conveyers and said cutter when said frame is lowered with respect to said wheels.

In testimony whereof I have signed my name to this specification in the presence of two subscribing witnesses.

ADOLPH F. DJUBERG.

Witnesses:
JOHN HOILAND,
THEODORE S. LINDLOUD.